No. 862,802. PATENTED AUG. 6, 1907.
L. BRUGEL.
COMBINED COVER AND HOLDER FOR DRINKING VESSELS.
APPLICATION FILED JAN. 23, 1907.
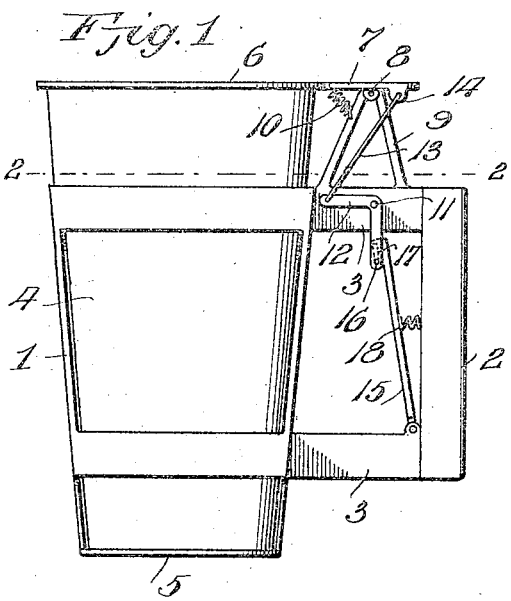
Inventor
Ludwig Brugel,
Witnesses
Frank Hough
F. A. Elmor
By Victor J. Evans
Attorney

UNITED STATES PATENT OFFICE.

LUDWIG BRUGEL, OF BALTIMORE, MARYLAND.

COMBINED COVER AND HOLDER FOR DRINKING VESSELS.

No. 862,802.

Specification of Letters Patent.

Patented Aug. 6, 1907.

Application filed January 23, 1907. Serial No. 353,673.

*To all whom it may concern:*

Be it known that I, LUDWIG BRUGEL, a subject of the Emperor of Germany, residing at Baltimore, in the county of Baltimore City and State of Maryland, have invented new and useful Improvements in a Combined Cover and Holder for Drinking Vessels, of which the following is a specification.

This invention relates to a combined cover and holder for drinking vessels, being designed especially for use in connection with soda water glasses, and has for its objects to provide a comparatively simple, inexpensive device of this character wherein the cover will entirely close the vessel and prevent the entrance of foreign matter thereinto, one in which the cover may be readily moved to open position at the will of the drinker, and one wherein the cover will, during the intervals between drafts, move automatically to closed position.

With these and other objects in view, the invention comprises the novel features of construction and combination of parts more fully hereinafter described.

In the accompanying drawings: Figure 1 is a side elevation of a device embodying the invention and showing the same applied for use. Fig. 2 is a plan view, partly in section, of the holder with the drinking vessel removed therefrom, the section being taken on the line 2—2 of Fig. 1.

Referring to the drawings, 1 designates the holder provided with a handle 2, preferably of the form shown, presenting upper and lower end portions 3, the holder, which is of skeleton formation, being designed to receive a glass or other drinking vessel 4 and having a bottom 5 on which the bottom of the vessel rests when positioned in the holder.

Arranged to seat over and close the upper end or mouth of the vessel 4 is a closure plate or cover 6 provided with a rearwardly projecting, radial portion or arm 7 fulcrumed between its ends by means of a pintle 8 to the upper end of a bearing bracket 9 formed on the upper end portion 3 of the handle, there being connected between the bracket 9 and cover 6 an expansible spring 10 for holding the cover in closed position and against the action of which the lever moves, as presently explained.

Pivoted at its elbow, as at 11, to the upper end portion 3 of the handle is a bell crank lever 12 disposed as shown, presenting a vertically depending arm and an inwardly projecting horizontal arm, to the inner end of which there is pivoted one end of a link connection 13 having its other end pivotally engaged with an ear 14 formed on the arm 7 in rear of the fulcrum 8, while pivoted at its lower end to the handle 2 is an operating lever 15 having its upper end attached by a pin and slot connection 16, 17, with the lower end of the vertical portion of lever 12, there being arranged between the lever 15 and handle 2 a compressible spring 18 against the action of which the lever moves.

In practice, when the vessel is arranged in the holder, the cover 6 will effectually close the upper end of the vessel and be maintained in closed position by means of the spring 10. During the operation of drinking, the handle 2 is grasped and when it is desired to move the cover 6 to open position, pressure is exerted on the lever 15 for moving the same against the action of spring 18 toward the handle 2, whereby the lever 12 will be rocked on its pivot in a direction for exerting downward traction on the connection 13 and rear end of the arm 6, thus throwing the cover to open position, it being noted that when pressure on the lever 15 is relieved, the spring 10 will move the cover automatically to closed position.

It is to be observed that in the operation of the device the contents of the vessel will be effectually protected against contamination by dust or other foreign substances and that the cover may, by slight pressure on the lever 15, be moved to open position at the will of the operator.

Having thus described my invention, what I claim is:

1. In a device of the class described, the combination of a structure comprising a handle and a pair of rings outstanding therefrom and integrally connected therewith, an upward extension on the handle, a cover fulcrumed on the extension, a bell crank lever on the handle, a pitman between the lever and cover, a spring connected with the cover for holding it closed, a spring pressed lever operated by the hand while gripping the handle, and a slot and pin connection between the last mentioned lever and the bell crank lever.

2. In a device of the class described, the combination of a handle, means thereon for holding a vessel, a bracket on the top of the handle, a cover hinged on the bracket, a spring between the bracket and cover for holding the latter closed, a bell crank lever fulcrumed on the handle, a pitman connecting the cover and lever, and a spring pressed member on the handle and connected with the lever for actuating the same.

In testimony, whereof, I affix my signature in presence of two witnesses.

LUDWIG BRUGEL.

Witnesses:
E. G. SHIPLEY,
PHILIP BISSON.